(12) United States Patent
    Liu et al.

(10) Patent No.: US 9,816,327 B2
(45) Date of Patent: Nov. 14, 2017

(54) INFORMATION TRANSMISSION APPARATUS FOR LOGGING WHILE DRILLING

(71) Applicants: CHINA NATIONAL PETROLEUM CORPORATION, Beijing (CN); CNPC DRILLING RESEARCH INSTITUTE, Beijing (CN); BEIJING PETROLEUM MACHINERY FACTORY, Beijing (CN)

(72) Inventors: Guanghua Liu, Beijing (CN); Lianyang Zou, Beijing (CN); Xinli Liu, Beijing (CN); Yanfu Huang, Beijing (CN); Shikai Tao, Beijing (CN); Wenjing Yang, Beijing (CN); Guoxing Yan, Beijing (CN); Hongjiang Shi, Beijing (CN); Tiejun Li, Beijing (CN); Chen Wang, Beijing (CN); Qian Shi, Beijing (CN); Chengqin Sun, Beijing (CN); Chunhua Zhang, Beijing (CN); Zhiyong Zhou, Beijing (CN); Xingming Pan, Beijing (CN); Qingkui Wu, Beijing (CN); Zhangjian Li, Beijing (CN)

(73) Assignees: CHINA NATIONAL PETROLEUM CORPORATION, Beijing (CN); CNPC DRILLING RESEARCH INSTITUTE, Beijing (CN); BEIJING PETROLEUM MACHINERY FACTORY, Beijing (CN)

( * ) Notice: Subject to any disclaimer, the term of this patent is extended or adjusted under 35 U.S.C. 154(b) by 381 days.

(21) Appl. No.: 14/415,944

(22) PCT Filed: Jun. 18, 2013

(86) PCT No.: PCT/CN2013/000713
    § 371 (c)(1),
    (2) Date: Jan. 20, 2015

(87) PCT Pub. No.: WO2014/012349
    PCT Pub. Date: Jan. 23, 2014

(65) Prior Publication Data
    US 2015/0152726 A1    Jun. 4, 2015

(30) Foreign Application Priority Data
    Jul. 20, 2012  (CN) .......................... 2012 1 0253592

(51) Int. Cl.
    *E21B 17/02*        (2006.01)
    *E21B 47/13*        (2012.01)
    (Continued)

(52) U.S. Cl.
    CPC .......... *E21B 17/028* (2013.01); *E21B 17/003* (2013.01); *E21B 47/12* (2013.01); *E21B 47/122* (2013.01); *F16L 11/127* (2013.01)

(58) Field of Classification Search
    CPC ...... E21B 47/122; E21B 17/003; E21B 47/12; E21B 17/028; F16L 11/127
    See application file for complete search history.

(56) References Cited

U.S. PATENT DOCUMENTS 2,000,716 A * 5/1935 Polk ...................... E21B 17/028
                                                         174/47
2,096,359 A * 10/1937 Hawthorn ............. E21B 17/028
                                                        138/111
(Continued)

FOREIGN PATENT DOCUMENTS

CN          101082267       12/2007
CN          101082268 A     12/2007
                (Continued)

OTHER PUBLICATIONS

First Office Action for counterpart Chinese Patent Application No. 201210253592.9, dated Jun. 17, 2015.
(Continued)

*Primary Examiner* — Blake E Michener
(74) *Attorney, Agent, or Firm* — Loza & Loza, LLP; Michael F. Fedrick

(57) ABSTRACT

An information transmission apparatus for logging while drilling comprises a hollow drilling rod and at least one cable. The drilling rod comprises at least one first drilling rod member and at least one second drilling rod member spliced to each other alternately. The first drilling rod member comprises a through hole, and the second drilling rod member comprises a stepped hole. The cable comprises a fixed end, a connected end, and a folded portion connect the fixed end to the connected end. Each of the cables is fixed in the stepped hole through a fixed end or is connected to a connected end of an adjacent cable. The connected end may be stretched along the stepped hole, and stretched through the through hole to be electrically connected to a logging instrument or a fixed end of the adjacent cable. The apparatus provides protection for a cable through a hollow drilling rod, thereby improving the transmission reliability.

9 Claims, 2 Drawing Sheets

(51) Int. Cl.
*F16L 11/127* (2006.01)
*E21B 47/12* (2012.01)
*E21B 17/00* (2006.01)

(56) References Cited

U.S. PATENT DOCUMENTS

| | | | | |
|---|---|---|---|---|
| 2,197,392 A * | 4/1940 | Hawthorn | ............ | E21B 17/003 174/47 |
| 3,253,245 A * | 5/1966 | Brandt | ................ | E21B 17/028 174/47 |
| 4,095,865 A * | 6/1978 | Denison | ............... | E21B 17/003 340/855.2 |
| 4,220,381 A * | 9/1980 | van der Graaf | ...... | E21B 17/028 340/853.7 |
| 4,319,240 A * | 3/1982 | Stone | .................... | E21B 47/187 175/40 |
| 4,605,268 A * | 8/1986 | Meador | ................ | E21B 17/028 340/855.2 |
| 4,697,641 A | 10/1987 | White | | |
| 6,396,414 B1 * | 5/2002 | Bickford | ............... | H01B 7/065 174/47 |
| 6,991,035 B2 * | 1/2006 | Hall | ....................... | E21B 31/107 166/178 |
| 9,466,916 B2 * | 10/2016 | Li | ....................... | H01R 13/4538 |
| 2003/0070842 A1 * | 4/2003 | Bailey | ...................... | E21B 7/06 175/24 |
| 2004/0150532 A1 * | 8/2004 | Hall | ...................... | E21B 17/003 340/854.3 |
| 2004/0150533 A1 * | 8/2004 | Hall | ...................... | E21B 17/003 340/854.4 |
| 2005/0285706 A1 | 12/2005 | Hall et al. | | |
| 2006/0225926 A1 | 10/2006 | Madhavan et al. | | |
| 2007/0159351 A1 * | 7/2007 | Madhavan | ............ | E21B 17/003 340/855.1 |
| 2012/0111555 A1 * | 5/2012 | Leveau | ................. | E21B 17/028 166/65.1 |
| 2015/0152726 A1 | 6/2015 | Liu et al. | | |

FOREIGN PATENT DOCUMENTS

| | | |
|---|---|---|
| CN | 201144695 Y | 11/2008 |
| CN | 201486478 | 5/2010 |
| CN | 201486548 U | 5/2010 |
| CN | 101975057 | 2/2011 |
| CN | 102400671 A | 4/2012 |
| WO | 2014012349 | 1/2014 |

OTHER PUBLICATIONS

Search report for counterpart Chinese Patent Application No. 201210253592.9, dated Jun. 17, 2015.
Second Office Action for counterpart Chinese Patent Application No. 201210253592.9, dated Jan. 28, 2016.
Office Action dated Jan. 5, 2016 for counterpart Canadian Patent Application No. 2,879,575.
International Search Report for PCT/CN13/00713 dated Oct. 3, 2013; 8 pages.
International Written Opinion for PCT/CN13/00713 dated Oct. 3, 2013; 10 pages.

* cited by examiner

INFORMATION TRANSMISSION APPARATUS FOR LOGGING WHILE DRILLING

FIELD OF THE INVENTION

The invention relates to the field of petroleum and natural gas drilling, and particularly, to an information transmission apparatus for logging while drilling.

BACKGROUND OF THE INVENTION

With the development of petroleum and natural gas, in order to acquire the underground conditions in time, the underground information used to be transmitted to the working personnel (geologists) above the ground through the technology for logging while drilling.

With the continuous development of the technology, the methods for logging while drilling are constantly enriched, including not only conventional methods using gamma, neutron porosity, lithologic density, phase-shift resistance, attenuation resistance, etc., but also azimuthal angle logging technology during drilling, e.g., the azimuthal density neutron logging instrument provides azimuthal density and photoelectric factor, the bit resistivity instrument provides azimuthal gamma and real-time resistivity image, the quantitatively imaged logging with multiple depths of investigation, the near-bit geosteering logging, the rotary steering logging, etc. Diversified logging while drilling and steering technologies provide rich underground information to the working personnel (geologists) above the ground. The information is uploaded to the ground surface from the underground through an information transmission passage. According to the information, the working personnel can analyze and judge the geological condition and the engineering condition of the stratum being drilled to duly adjust the drilling direction and control the optimum well track. In addition, the drilling parameter can be adjusted in time according to the engineering condition, so as to predictively prevent various unsafe working conditions underground and ensure the safe production. However, when the existing apparatus for logging or azimuthal logging while drilling is used, the inventor finds that the prior art at least has the following problems: the existing information transmission mainly includes transmission modes of mud-pulse, electromagnetic wave and electromagnetic coupling, while those transmission modes have the problems that the information transmission speed is slow, the influence from the underground bushing and the complex working conditions, and the transmission reliability is poor. Thus, only a small part of the rich information obtained by the logging or azimuthal logging while drilling is transmitted to the ground surface in real time, and the transmitted data even may be lost, which is very adverse for the decision maker above the ground to exactly make judgment and decision regarding the underground conditions in real time.

SUMMARY OF THE INVENTION

In order to solve the above problems that the information transmission speed is too slow, the external interference is obvious and the transmission reliability is poor, the embodiment of the invention provides an information transmission apparatus for logging while drilling. The technical solution is as follows:

Firstly, an information transmission apparatus for logging while drilling is provided, comprising a hollow drilling rod electrically connected to a ground equipment and at least one cable, wherein the drilling rod comprises at least one first drilling rod member and at least one second drilling rod member spliced to each other alternately; the first drilling rod member comprises a through hole, and the second drilling rod member comprises a stepped hole; each of the cables comprises a fixed end, a connected end, and a folding portion connecting the fixed end to the connected end; each of the cables is fixed in the stepped hole through the fixed end or is connected to a connected end of an adjacent cable; the connected end is stretchable along the stepped hole, and stretched through the through hole to be electrically connected to a logging instrument or a fixed end of the adjacent cable.

Further, the helical folding portion is twined to the corresponding cable.

Further, the stepped hole comprises a first segment hole penetrating the first end of the second drilling rod member, the first segment hole has a trumpet-shaped cross-section, and the fixed end is fixed to an inner wall of the first segment hole.

Further, each of the first drilling rod members is extended to be provided with a tenon which is fixed in the first segment hole.

Further, the stepped hole further comprises a receiving portion connected to the first segment hole, and a second segment hole penetrating the second end of the second drilling rod member; the folding portion is accommodated in the receiving portion, and the connected end is electrically connected to the logging instrument or the fixed end of the adjacent cable after extending and passing through the second segment hole.

Further, the stepped hole is further provided with a transition portion between the receiving portion and the second segment hole; a diameter of the transition portion is smaller than that of the receiving portion and the second segment hole; two stepped surfaces are formed between the transition portion and the receiving portion, and between the transition portion and the second segment hole; a passage penetrating the two stepped surfaces is provided between the two stepped surfaces; the folding portion abuts against one of the two stepped surfaces, and the connected end extends to the second segment hole after passing through the passage.

Further, the second end of each of the second drilling rods extends to form a connected portion, each of the first drilling rods is provided with a connected port, and the connected portion is fixed in the connected port.

Further, the connected portion is provided with external threads and the connected port is provided with internal threads, and the connected portion is in a threaded connection with the connected port.

Further, an outer wall surface of the connected portion and an inner wall surface of the connected port are both oblique surfaces.

Further, the fixed end and the connected end of each of the cables are both provided with an abutting device, and the cables are abutted with or separated from each other through the abutting device.

DETAILED DESCRIPTION OF THE
PREFERRED EMBODIMENTS

In order that the object, technical solution and advantages of the invention are clearer, the embodiment of the invention will be further described detailedly as follows with reference to the accompanied drawings.

Figure 1:
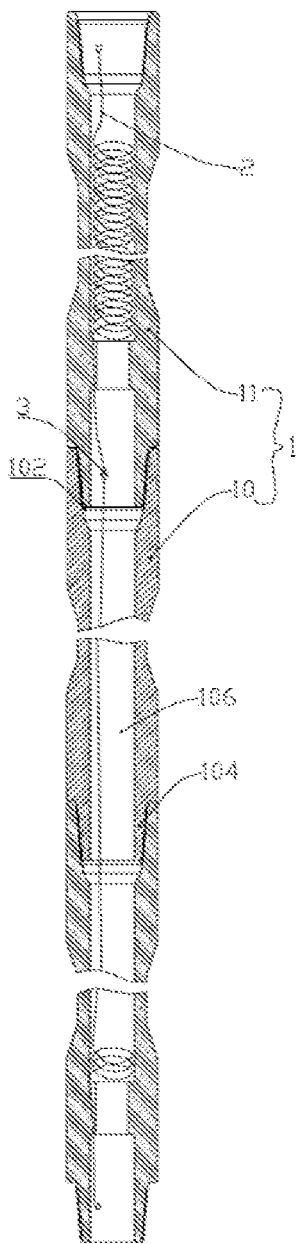
FIG. 1 is a schematic diagram of a part of mechanism of an information transmission apparatus for logging while drilling provided by the embodiment of the invention.

Referring to FIG. 1, the embodiment of the invention provides an information transmission apparatus for logging while drilling, comprising a hollow drilling rod 1 and at least one cable 2 provided therein. In which, the drilling rod 1 is connected to a ground equipment. The cable 2 has one end electrically connected to a logging instrument (not illustrated), and the other end electrically connected to a ground equipment above ground (not illustrated), so as to transmit various information of the underground stratums obtained by the logging instrument to the ground equipment through the cable 2. Thus the working personnel can analyze and judge the geological condition and the engineering condition of the stratum being drilled to duly adjust the drilling direction and control the optimum well track.

Figure 2:
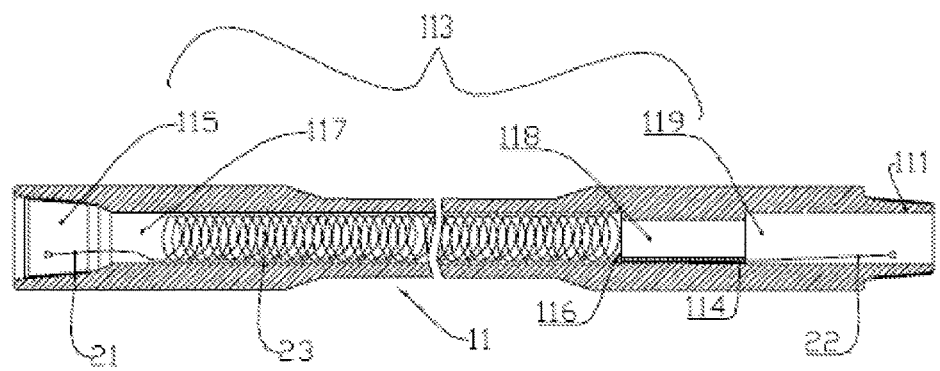
FIG. 2 is a schematic diagram of the part of mechanism in FIG. 1.

Referring to FIG. 2, each of the cables 2 comprises a fixed end 21, a connected end 22 opposite to the fixed end 21, and a folding portion 23 connected the fixed end 21 to the connected end 22. Preferably, the folding portion 23 is helical, i.e., is formed by winding the cable 2, to increase the stretch of the cable 2 so that the cable 2 can be freely stretched. In this embodiment, the connected end 22 is provided with an abutting device 3 to electrically connect the cable 2 to a fixed end 21 of an adjacent cable 2 or the logging instrument. The fixed end 21 may be alternatively fixed in the hollow drilling rod 1 or connected to a connected end 22 of an adjacent cable 2. Preferably, the fixed end 21 is provided with an abutting device 3 so as to be fixed in the hollow drilling rod 1 through the abutting device 3.

The hollow drilling rod 1 comprises at least one first drilling rod member 10 and at least one second drilling rod member 11 spliced to each other alternately.

A first end of each of the first drilling rod members 10 is provided with a connected port 102. In this embodiment, the inner wall of the connected port 102 has threads. A second end of the first drilling rod member 10 extends to form a tenon 104 fixed to an adjacent second drilling rod member 11. In other embodiment, the tenon 104 may also has threads so as to form a threaded connection with the adjacent second drilling rod member 11. The axis of each of the first drilling rod members 10 is further provided with a through hole 106 penetrating the connected port 102 and the tenon 104, so that the cable 2 passes therethrough.

Each of the second drilling rod members 11 comprises a first end and a second end opposite thereto. The second end of the second drilling rod member 11 extends to form a connected portion 111. Preferably, the connected portion 111 has threads so as to form a threaded connection with the connected port 102 of the adjacent first drilling rod member 10. In other embodiment, the connected portion 111 of each of the second drilling rod members 11 may also be connected to the connected port 102 of the adjacent first drilling rod member 10 through a snap fit, an interference fit, etc. Each of the second drilling rod members 11 is provided along the axis with a stepped hole 113 penetrating the first and second ends of the second drilling rod 11. The stepped hole 113 comprises a first segment hole 115 penetrating the first end of the second drilling rod member 11, a receiving portion 117 obliquely connected to the first segment hole 115, a transition portion 118 connected to the receiving portion 117, and a second segment hole 119 connected to and penetrating the second end of the second drilling rod member 11.

The first segment hole 115 has a trumpet-shaped cross-section, which has a larger diameter at the position close to the first end of the second drilling rod 11, so that the cable 2 is provided from the first segment hole 115, and the fixed end 21 of the cable 2 is optionally fixed to the inner wall of the first segment hole 115. Preferably, the inner wall of the first segment hole 115 is provided with a fixed hole or a device connector to fix the fixed end 21 of the cable 2. In addition, the tenon 104 of the first drilling rod member 11 may be fixedly inserted into the first segment hole 115. The transition portion 118 is located between the receiving portion 117 and the second segment hole 119, and the diameter of the transition portion 118 is smaller than that of the receiving portion 117 and the second segment hole 119, thus two stepped surfaces 116 are formed between the transition portion 118 and the receiving portion 117, and between the transition portion 118 and the second segment hole 119. The hollow drilling rod 1 is further provided with a passage 114 penetrating the two stepped surfaces 116. The folding portion 23 of the cable 2 is accommodated in the receiving portion 117, and the connected end 22 of the cable 2 is located in the second segment hole 119 after passing through the passage 114. Thus the cable 2 can be elongated by being stretched in the second segment hole 119 for the convenience of usage. In addition, during the usage, the end of the folding portion 23 closer to the connected end 22 always abuts against one of the stepped surfaces 116 to prevent the cable 2 from being tied or disordered during the stretch, which also helps to prevent the cable 2 from slipping off the second drilling rod member 11. In other embodiment, the transition portion 118 and the passage 114 may be not provided, and instead, the connected end 22 is directly accommodated in the second segment hole 119 after coming out from the receiving portion 117.

Preferably, for the convenience of mounting, the outer wall surface of the tenon 104 of each of the first drilling rod members 10, the outer wall surface of the connected portion 111 of each of the second drilling rod members 11, and the inner wall surface of the connected port 102 of each of the first drilling rod members 10 are obliquely provided.

Referring to FIG. 1 again, when the information transmission apparatus for logging while drilling of the invention is employed, firstly each of the cables 2 is fixedly mounted in corresponding second drilling rod member 11; next, the connected portion 111 of each of the second drilling rod members 11 is fixed in the connected port 102 of corresponding first drilling rod member 10; after a stretch, the connected end 22 of each of the cables 2 penetrates the through hole 106 of corresponding first drilling rod member 10 and then is connected to the fixed end 21 of the cable 2 of a next adjacent second drilling rod member 11 or the logging instrument. The fixed end 21 of the cable 2 close to the ground equipment is fixed to the inner wall of the first segment hole 115 of corresponding second drilling rod member 11.

Thus, according to the distance from the drilled well to the ground surface, at least one first drilling rod member 10 and at least one second drilling rod member 11 are spliced to each other alternately to form the drilling rod 1, and the through hole 106 of the first drilling rod member 10 and the stepped hole 113 of the second drilling rod member 11 form a passage where the cable 2 passes through after the splicing.

At least one cable 2 is connected to the logging instrument so that the logging instrument, the cable 2, the second drilling rod 11 closest to the ground surface and the ground equipment form a cycling circuit. Thus the information measured by the logging instrument is transmitted to the ground surface through electric signals for a usage by the working personnel above the ground, and the transmission speed is fast.

In conclusion, the through hole 106 of the first drilling rod member 10 and the stepped hole 113 of the second drilling rod member 11 in the information transmission apparatus for logging while drilling described in the embodiment of the invention are spliced to each other to form a passage where the cable 2 passes through, thereby providing a protection for the cable 2, overcoming the interference and influence on the information transmission by the underground bushing and complex working conditions, and improving the transmission reliability. In addition, the information transmission apparatus for logging while drilling of the invention directly uses the cable 2 to perform the information and data transmission, thus the structure is simple and the transmission speed is fast.

INDUSTRIAL APPLICABILITY

The invention overcomes the problem of the interference and influence on the information transmission by the underground bushing and complex working conditions and the problem that the information transmission speed is slow. Specifically, the through hole of the first drilling rod member and the stepped hole of the second drilling rod member in the information transmission apparatus for logging while drilling of the invention are spliced to each other to form a passage where the cable passes through, thereby providing a protection for the cable, overcoming the interference and influence on the information transmission by the underground bushing and complex working conditions, and improving the transmission reliability. In addition, the information transmission apparatus for logging while drilling of the invention directly uses the cable to perform the information and data transmission, thus the structure is simple and the transmission speed is fast.

The invention claimed is:

1. An information transmission apparatus for logging while drilling, comprising a hollow drilling rod electrically connected to a piece of ground equipment and at least one cable, wherein the drilling rod comprises at least one first drilling rod member and at least one second drilling rod member connected to each other alternately; the first drilling rod member comprises a through hole, and the second drilling rod member comprises a stepped hole; each of the cables comprises a fixed end, a connected end, and a folding portion connecting the fixed end to the connected end; each of the cables is fixed in the stepped hole through the fixed end or is connected to a connected end of an adjacent cable; the connected end is stretchable along the stepped hole, and stretched through the through hole to be electrically connected to a logging instrument or a fixed end of the adjacent cable, wherein the stepped hole comprises a first segment hole in communication with a first end of the second drilling rod member, a receiving portion obliquely connected to the first segment hole, a transition portion connected to the receiving portion, and a second segment hole connected to and in communication with the second end of the second drilling rod member; a diameter of the transition portion is smaller than that of the receiving portion and the second segment hole; a first stepped surface is formed between the transition portion and the receiving portion, and a second stepped surface is formed between the transition portion and the second segment hole; a passage in communication with the first and second stepped surfaces is provided between the first and second stepped surfaces; the folding portion abuts against one of the first and second stepped surfaces; and the connected end extends to the second segment hole after passing through the passage.

2. The information transmission apparatus for logging while drilling according to claim 1, wherein the folding portion is helical and is formed by winding the corresponding cable.

3. The information transmission apparatus for logging while drilling according to claim 1, wherein the first segment hole has a flared cross-section, and the fixed end is fixed to an inner wall of the first segment hole.

4. The information transmission apparatus for logging while drilling according to claim 3, wherein each of the first drilling rod members is extended to be provided with a tenon which is fixed in the first segment hole.

5. The information transmission apparatus for logging while drilling according to claim 3, wherein the folding portion is accommodated in the receiving portion, and the connected end is electrically connected to the logging instrument or the fixed end of the adjacent cable after extending and passing through the second segment hole.

6. The information transmission apparatus for logging while drilling according to claim 5, wherein the second end of each of the second drilling rods members extends to form a connected portion, each of the first drilling rod members is provided with a connected port, and the connected portion is fixed in the connected port.

7. The information transmission apparatus for logging while drilling according to claim 6, wherein the connected portion is provided with external threads and the connected port is provided with internal threads, and the connected portion is in a threaded connection with the connected port.

8. The information transmission apparatus for logging while drilling according to claim 6, wherein an outer wall surface of the connected portion and an inner wall surface of the connected port are both oblique surfaces.

9. The information transmission apparatus for logging while drilling according to claim 1, wherein the fixed end and the connected end of each of the cables are both provided with an abutting device, and the cables are abutted with or separated from each other through the abutting device.

* * * * *